(12) United States Patent
Williams et al.

(10) Patent No.: US 9,854,096 B2
(45) Date of Patent: Dec. 26, 2017

(54) USING SECONDARY CHANNEL INFORMATION TO PROVIDE FOR GATEWAY RECORDING

(71) Applicant: Verint Americas Inc., Roswell, GA (US)

(72) Inventors: Jamie Richard Williams, Fleet (GB); Marc Calahan, Woodstock, GA (US); Scott M. Bluman, Atlanta, GA (US)

(73) Assignee: VERINT AMERICAS INC., Alpharetta, GA (US)

( * ) Notice: Subject to any disclaimer, the term of this patent is extended or adjusted under 35 U.S.C. 154(b) by 0 days.

(21) Appl. No.: 15/088,555

(22) Filed: Apr. 1, 2016

(65) Prior Publication Data

US 2016/0277578 A1    Sep. 22, 2016

Related U.S. Application Data

(63) Continuation of application No. 13/252,986, filed on Oct. 4, 2011, now Pat. No. 9,307,092.

(Continued)

(51) Int. Cl.
*H04M 3/00* (2006.01)
*H04M 3/51* (2006.01)
(Continued)

(52) U.S. Cl.
CPC ........ *H04M 3/5175* (2013.01); *H04L 65/104* (2013.01); *H04L 65/1006* (2013.01);
(Continued)

(58) Field of Classification Search
USPC ... 379/265.07, 142.13, 70, 213.01, 9.01, 41, 379/85, 88.26, 214.01
See application file for complete search history.

(56) References Cited

U.S. PATENT DOCUMENTS 5,946,375 A    8/1999  Pattison et al.
6,731,625 B1   5/2004  Eastep et al.
(Continued)

FOREIGN PATENT DOCUMENTS

EP    0627684 A1    12/1994
EP    1679864 A1    7/2006
(Continued)

OTHER PUBLICATIONS

RD 416021 A, Dec. 10, 1998.
(Continued)

*Primary Examiner* — Yosef K Laekemariam
(74) *Attorney, Agent, or Firm* — Meunier Carlin & Curfman

(57) ABSTRACT

Systems and methods for using secondary communication channel information, such as RTCP information to facilitate correlating business information to allow gateway recording. Using information in this secondary communication channel the recording system can correlate the business metadata either directly (e.g., using a phone extension) or through one or more indirect operations (e.g., a call ID-to-universal call id-to-phone extension). Additionally, information in the primary communication channel may be used to perform an indirect operation to correlate auxiliary business information (e.g., using the CALLID or UCID in SIP signaling to resolve the agent's phone extension and thereby access auxiliary business information.)

15 Claims, 5 Drawing Sheets

Related U.S. Application Data

(60) Provisional application No. 61/389,342, filed on Oct. 4, 2010.

(51) Int. Cl.
| | | |
|---|---|---|
| *H04M 15/06* | (2006.01) | |
| *H04L 29/06* | (2006.01) | |
| *H04L 29/08* | (2006.01) | |
| *H04M 3/22* | (2006.01) | |
| *H04M 3/42* | (2006.01) | |
| *H04M 15/00* | (2006.01) | |

(52) U.S. Cl.
CPC ........ *H04L 65/608* (2013.01); *H04L 67/1004* (2013.01); *H04M 3/00* (2013.01); *H04M 3/2218* (2013.01); *H04M 3/42221* (2013.01); *H04M 3/5183* (2013.01); *H04M 15/06* (2013.01); *H04M 15/56* (2013.01); *H04M 15/63* (2013.01)

(56) References Cited

U.S. PATENT DOCUMENTS

| | | |
|---|---|---|
| 6,795,868 B1 | 9/2004 | Dingman et al. |
| 6,917,625 B1 | 7/2005 | Brush et al. |
| 7,023,979 B1 | 4/2006 | Wu et al. |
| 7,027,463 B2 | 4/2006 | Mathew et al. |
| 7,155,641 B2 | 12/2006 | Prang et al. |
| 7,254,109 B2 | 8/2007 | Verma et al. |
| 7,286,652 B1 | 10/2007 | Azriel et al. |
| 7,587,507 B2 | 9/2009 | Klemets |
| 8,132,089 B1 | 3/2012 | Blair |
| 8,427,981 B2 * | 4/2013 | Wyss ..................... H04L 63/00 370/260 |
| 2001/0033644 A1 | 10/2001 | Offer |
| 2002/0064149 A1 | 5/2002 | Elliott et al. |
| 2002/0071529 A1 | 6/2002 | Nelkenbaum |
| 2003/0105884 A1 | 6/2003 | Upton |
| 2004/0208165 A1 | 10/2004 | Cai et al. |
| 2005/0058313 A1 | 3/2005 | Victorian et al. |
| 2005/0108593 A1 | 5/2005 | Purushothaman et al. |
| 2005/0198281 A1 | 9/2005 | Wang et al. |
| 2005/0231617 A1 | 10/2005 | Kitani |
| 2005/0246612 A1 | 11/2005 | Leis et al. |
| 2006/0045067 A1 | 3/2006 | Dezonno et al. |
| 2006/0053010 A1 * | 3/2006 | Chapman ............ H04M 3/2281 704/235 |
| 2006/0087555 A1 | 4/2006 | Boyd et al. |
| 2006/0150078 A1 | 7/2006 | Brookler et al. |
| 2006/0168111 A1 | 7/2006 | Gidwani |
| 2006/0282543 A1 | 12/2006 | Bowater et al. |
| 2007/0041330 A1 | 2/2007 | Bostica et al. |
| 2007/0143398 A1 | 6/2007 | Graham |
| 2007/0171898 A1 | 7/2007 | Salva |
| 2007/0201502 A1 | 8/2007 | Abramson |
| 2007/0230345 A1 | 10/2007 | Spohrer et al. |
| 2008/0037725 A1 | 2/2008 | Berstis et al. |
| 2008/0063167 A1 * | 3/2008 | Rao ................... G06Q 10/0631 379/142.13 |
| 2008/0219243 A1 | 9/2008 | Silverman |
| 2008/0253363 A1 | 10/2008 | Altberg et al. |
| 2009/0016522 A1 | 1/2009 | Torres et al. |
| 2012/0321146 A1 | 12/2012 | Kundu et al. |

FOREIGN PATENT DOCUMENTS

| | | |
|---|---|---|
| JP | 01160247 A | 6/1989 |
| KR | 2005070722 A | 7/2005 |

OTHER PUBLICATIONS

U.S. Official Action dated Jun. 7, 2012 in U.S. Appl. No. 12/118,789.

U.S. Official Action dated Jun. 29, 2012 in U.S. Appl. No. 12/118,792.

* cited by examiner

USING SECONDARY CHANNEL INFORMATION TO PROVIDE FOR GATEWAY RECORDING

CROSS-REFERENCE TO RELATED APPLICATION

The present application is a Continuation of U.S. patent application Ser. No. 13/252,986, filed Oct. 4, 2011, which claims priority to U.S. Provisional Patent Application No. 61/389,342, filed Oct. 4, 2010, and entitled "RTCP FOR GATEWAY RECORDING," the contents of which are incorporated herein by reference in its entirety.

BACKGROUND

In call centers with centralized trunking, recording may be centralized at the ingress or egress point of the call center trunks rather than at the edge network where the phones are physically located. Recording centrally reduces the number of interception points greatly simplifying the network topology requirements for recording. To obtain the maximum business value from call center recording, the recording system should capture the context of the call including the agent taking the call and other auxiliary business information surrounding the call. This context information is typically available through a Computer Telephony Integration (CTI) event integration to the call center PBX.

The challenge is to correlate the auxiliary business information with a media stream being recorded. In non-gateway recording environments correlating the auxiliary information is available in the primary communication channel (e.g., the call SIP signaling carries the call center agent's extension number or IP address of RTP stream end point). However, in gateway recording environments, it is possible that the primary communication channel does not provide correlating information. Yet further, in some environments, the primary communication channel provides correlating information for some calls but not others depending on the flow of the call in the environment. For example the media for some calls may flow directly to the agent's phone for some calls but be routed back to the PBX or conference resource for other call flows. When the call is diverted away from the phones, the information in the primary information channel may no longer be available for correlation to auxiliary business information.

SUMMARY

Disclosed herein are systems and methods for using Real Time Control Protocol (RTCP) information (or any secondary communication channel) to facilitate correlating business information in gateway recording environments. Using information in this secondary communication channel the recording system can correlate the business metadata either directly using, e.g., a phone extension or through one or more indirect operations such as call ID-to-universal call ID-to-phone extension. Additionally information in the primary communication channel may be used to perform an indirect operation to correlate auxiliary business information (e.g., use the CALLID or UCID in SIP signaling to resolve the agent's phone extension and thereby access auxiliary business information.)

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Disclosed herein are systems and methods for recording communication signals. In particular, in gateway recording environments where the primary communication channel does not provide correlating information, a secondary communication channel can be used to perform the correlation. An example of the secondary communication channel is the RTCP communication channel of a SIP call. RTCP may be utilized for network monitoring applications, e.g., to check packet jitter and voice quality.

Exemplary systems are first discussed with reference to the figures. Although these systems are described in detail, they are provided for purposes of illustration only and various modifications are feasible. After the exemplary systems are described, examples of flow diagrams and sequence diagrams of the systems are provided to explain the manner in which the communication signals can be recorded.

Figure 1:
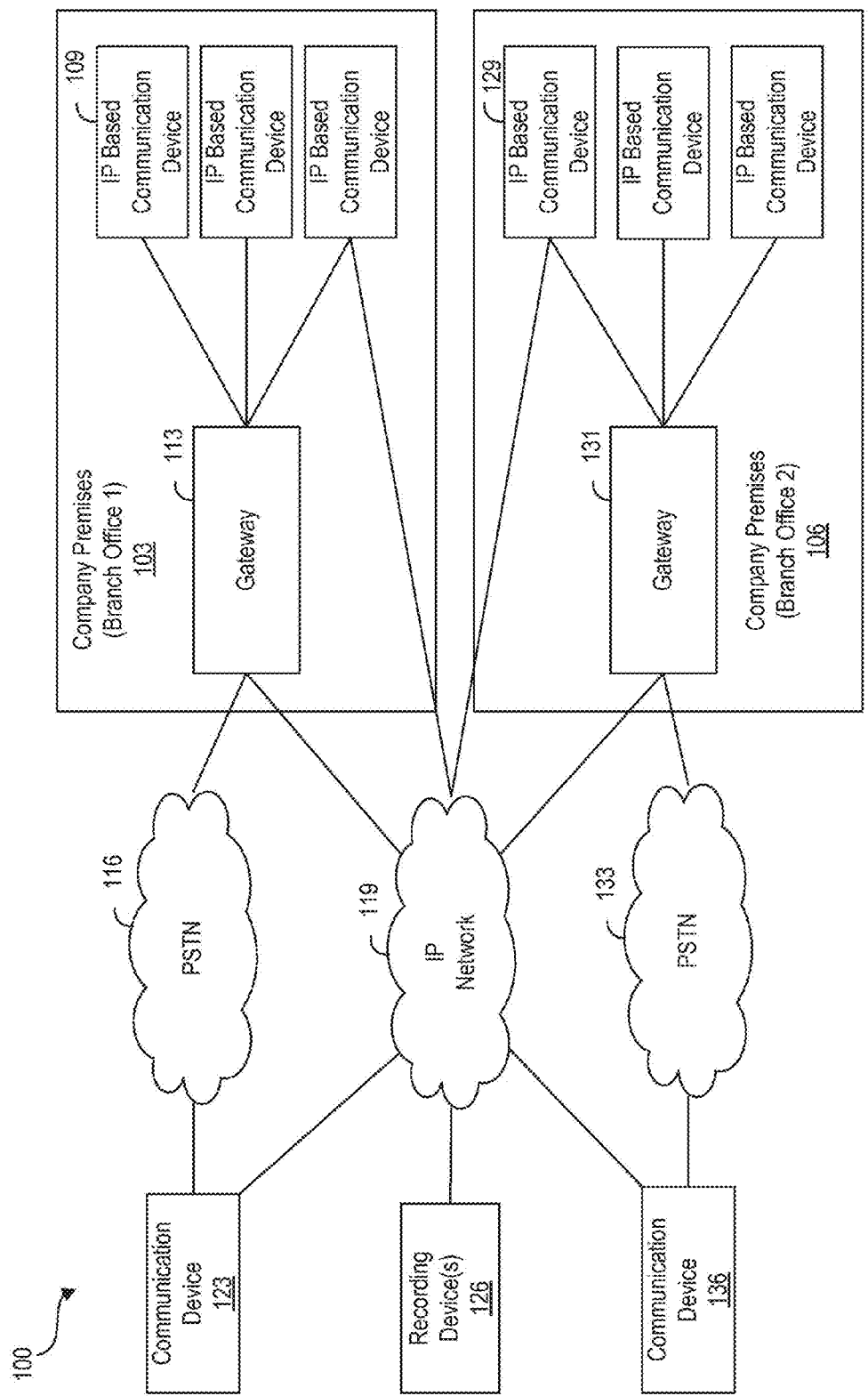
FIG. 1 is a schematic diagram of an implementation of a system in which voice and media communications can be recorded by an endpoint recorder located anywhere in a customer center premises.

Referring now in more detail to the figures, FIG. 1 is a systematic diagram of an implementation of a system in which voice and media communications can be recorded to an endpoint recorder. Two branch offices 103, 106 of a company may need to record communications with customers. Customer communication devices 123, 136 connect to branch offices 103, 106 either via an IP network 119 or via a PSTN network 116, 133, respectively. The customer communication devices 123, 136 can include, but are not limited to, telephones, soft-phones on hand held devices, or Personal Computers.

Recording device(s) 126 can be deployed anywhere on the IP network 119 connected to the branch offices 103, 106. Alternatively or additionally, the recording devices 126 can communicate with gateway 113, 131 in a secure fashion in encrypted environments, for getting communication events and for sending instructions. With the capability of the recording devices 126 to communicate with the media controlling/processing/distributing devices 113, 131, the recording device 126 can selectively record communications in the customer center using business rule policy. Alternatively or additionally, if a recording device is a cluster of recording devices, the recording device can communicate with the gateway 113, 131 to select which recording device from the cluster of recording devices to record the communications for load balancing purposes.

The media controlling/processing devices control the communication between customers and agents and between agents. The media controlling/processing devices can include, but are not limited to, voice gateways, soft switches, conference bridges, and multi-media application servers. The distributing devices can include, but are not limited to, routers and switches. Based on static configuration or instructions from the recording devices, the media controlling/processing devices can duplicate and transmit on-going communication between communication devices 109, 129, 123, 136 to the recording devices via the IP network 119 using its media processing features, such as conferencing. Alternatively or additionally, the gateways can also instruct the communication devices 109, 129 at the company premises 103, 131, respectively, to duplicate and transmit any on-going communications to the recording devices 126 using media processing features on the communication devices 109, 129.

Figure 2:
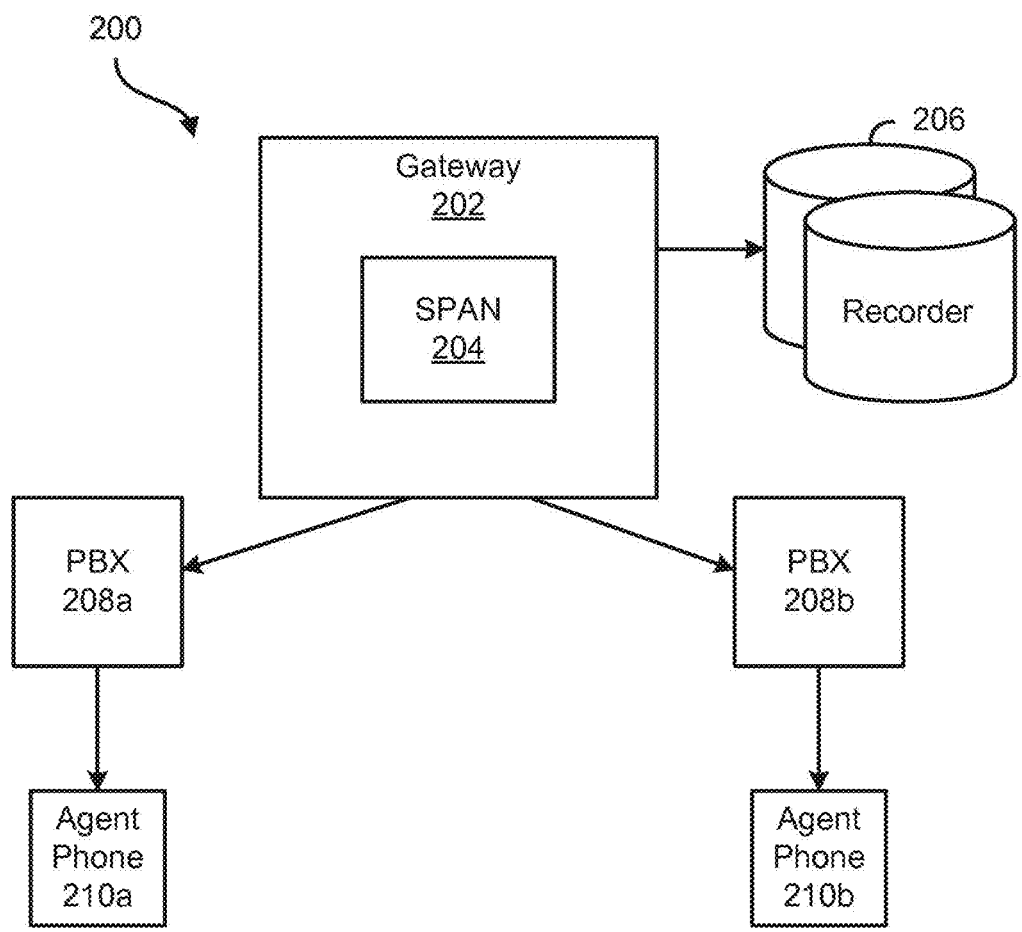
FIGS. 2 and 3 illustrate a VoIP-based contact center having a recording system.
Figure 3:
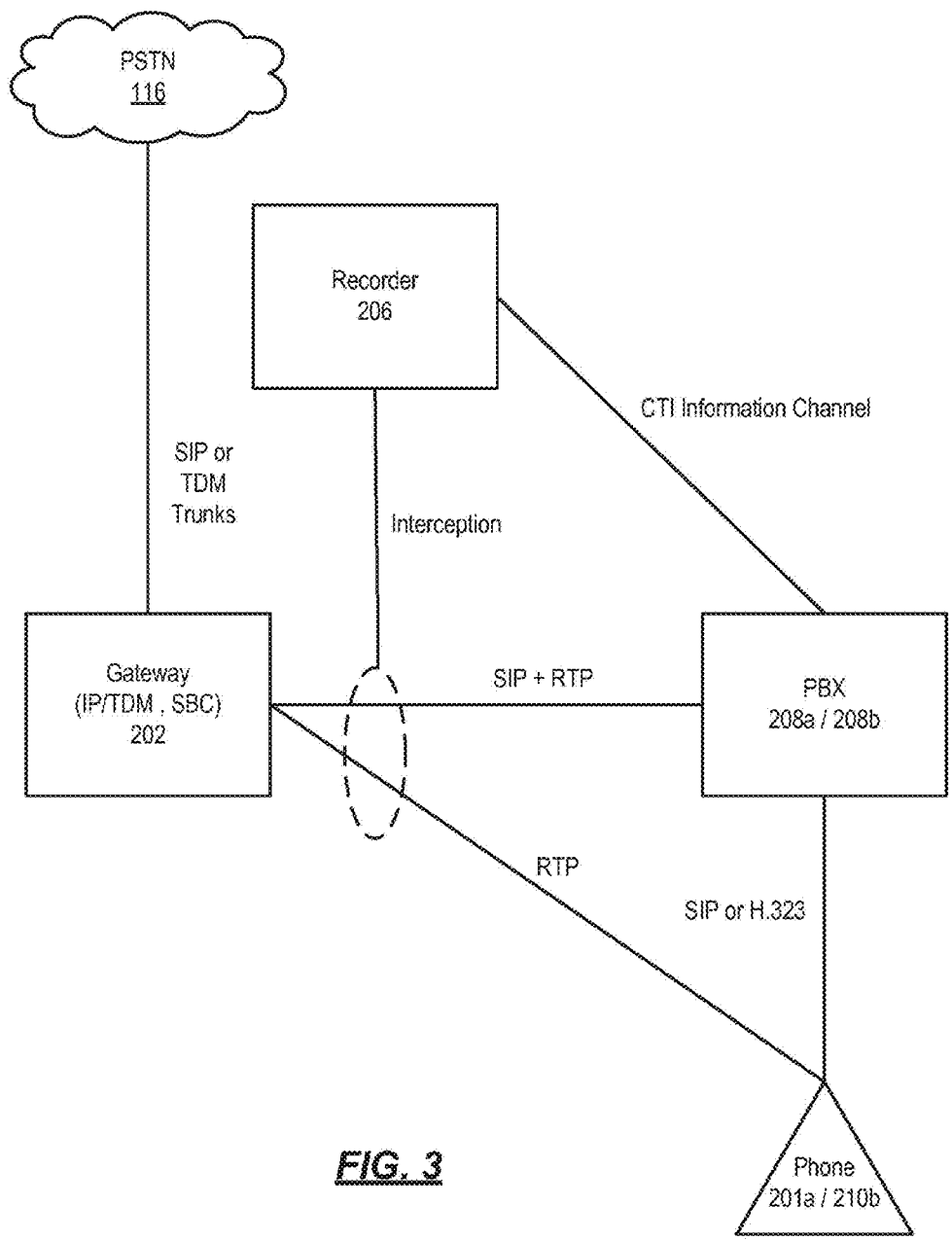

FIGS. 2 and 3 illustrate a VoIP-based contact center 200 having a recording system. The contact center (e.g., customer center telephony system) 200 may one of multiple contact centers that receive communications from a PSTN (not shown) that connects to a gateway 202 and then to one or more inbound SIP trunks. The SIP trunks may connect to Private Branch Exchanges (PBX) 208a and 208b that may connect to agent phones 210a and 210b, respectively. The PBXs 208a and 208b route the incoming calls according to the customer center policy to the agent phones. Although one phone is shown as being connected to each PBX 208a and 208b, additional agent phones may be connected thereto.

The data fields within the SIP protocol provide for recording of voice transactions from the gateway 202 having a Switched Port Analyzer (SPAN) 204. In general, the VoIP The recording system may be within the customer center telephony system. The gateway 202 may be configured as any of the voice gateways 313, 413, 513 described above and performs such functions as routing of communications, duplicating communications and transmitting of communications or duplicate communications to downstream components and/or a recorder 206.

The SPAN 204 may be a feature of the gateway 202 that enables the gateway 202 to copy the network traffic from one or more sources and provide it to a destination port. For example, these sources can be ports and/or virtual LANs (VLANs). The SPAN 204 may be configured to monitor incoming and outgoing packets passing through the gateway 202.

In some implementations, to record the media communications using passive tapping, a recorder 206 may be deployed at media processing devices or distribution devices (e.g., the gateway 202) using network traffic monitoring or duplicating features, such as the SPAN 204. These features are made available to the recorder 206, which is directly connected to the gateway 202, e.g., recorders deployed at each branch office. Hence, a large contact center having multiple branches, such as a branch in New York, a branch in Los Angeles, and a branch in Chicago, may use multiple recorders in each branch to record the media communications.

Various implementations described above may employ a Session Initiation Protocol (SIP) recording system or recorder configured to allow a customer center telephony system to integrate to a flexible integration point between recordable VoIP resources and the and other components associated with the customer center telephony system 200. To further expand the various SIP implementations, in at least one implementation, calls directed to a customer center telephony system can be terminated at the customer center telephony system and recorded by the by the customer center telephony system. This allows the customer center telephony system to develop add-ons and duplicate the interactions to a recording system. The recorder 206 can be configured to record all or a subset of interactions and prevent the development of error prone integration points for every contact center.

The recorder 206 may be configured to act as a generic SIP endpoint, emulating an SIP phone and/or an SIP trunk. One or more components may be present in at least one implementation of the recorder 206. For example, a recorder that terminates Real Time Protocol (RTP) endpoints to receive audio or other media associated with the communication. Second, a recorder controller may be included and may be responsible for controlling the actions of one or more recorders. The recorder controller may be configured to direct the recorders to receive media on open ports, instruct the recorders when to start and stop recordings on those ports, and tag the recording information to the recorders (e.g., associate data with the recording). Third, the recorder controller may also responsible for an SIP stack. The stack may receive SIP "INVITEs," and/or other SIP messages, make internal decisions on whether or not this specific interaction should be recorded, find a recorder that has resources to perform the recording. The stack and control the recording both on the SIP side, as well as on the recorder side. Fourth, the recorder 206 may include an application tier that may be configured to provide, at a minimum, applications to search and replay the interactions recorded.

One should note that tagging of recordings (e.g., associating data with a recording) may be utilized for retrieval and/or replay, such that an administrator (or other party) can find the recording based on the values tagged to the recording. Tagging may be utilized via Calling Line Identifier (CLI), Dialed Number Identification Service (DNIS), queue, agent name, and/or other types of tagging. The data fields within the SIP protocol may be used, for example, to associate call transfers across the PBXs 208a and 208b to tie the call together as one transaction. Unique information in the SIP protocol, such as a Globally Unique Identifier (GUID), Automatic Number Identification (ANI), dialed number identification service (DNIS) or any other field, may be used to associate other metadata with that transaction. For example, in some implementations, a GUID in the SIP protocol that is present in a CTI feed may be associated along with the receiving agent ID. In this way, the recording can be tagged with the agent ID, or business rules applied on if the recording should be made based on that association.

In some implementations, unique information in the SIP protocol, such as a GUID, ANI, DNIS or any other field, may be associated with the IP address or IP address/port number to differentiate voice recordings from a SIP trunk such that recordings can be identified by a unique identifier based on the information. This information can be used to tag the call or for recording decisions to be made.

In some implementations, unique information in the SIP protocol, such as a GUID, ANI, DNIS or any other field, may be used to allow the association of multiple recordings from the same calling party using the tagging information. For example where a voice transaction is transferred from one receiving device to another.

In some implementations, tagging associated with the "From" party and the "CallId" from the SIP INVITE message may be provided. As described in more detail below, Extended Tagging Integration (ETI) may be configured to provide additional attributes related to the interaction that can be sent to the recording center. In at least one non-limiting example, the tagging may be sent to the contact center, utilizing an "INFO" message. A contact center configuration import interface (not shown) may also be included. If attributes are not sent to the contact center, an administrator may be required to perform dual maintenance concerning employees and equipment associated with the contact center.

The X-CallPartyInfo header may be used to convey information about a party in the interaction. The party may be a known (agent or supervisor) or unknown (customer) party. There may be one or more X-CallPartyInfos in an SIP message. A recording interaction with a single mixed stream may include the X-CallPartyInfos for a single SIP Call. A recording interaction with multiple streams (where each stream is treated as a separate SIP Call) may have the X-CallPartyInfos associated with the stream on the specific SIP Call. The value of the X-CallPartyInfo header may contain the display name of the party, the SIP URI (if one exists), and the party's role in the interaction. If the SIP URI is not defined for a party, the SIP URI field will be just "<>". The role may include one or more of the following values: Caller, Called, Observer, Transferred, Conferenced, Consulted, and/or other formats. The format of the X-CallPartyInfo header may include "X-CallPartyInfo: DisplayName <SIP URI>;tag=value". The following are non-limiting examples using the syntax described above:

X-CallPartyInfo: "John Doe" <sip:2332@example.com>; role=Caller
X-CallPartyInfo: <sip:2332@example.com>
X-CallPartyInfo: <sip:2332@example.com>;role=Called
X-CallPartyInfo: "John Doe" <sip:2332@example.com>
X-CallPartyInfo: "John Doe" <>
X-CallPartyInfo: "John Doe" <>;role=Observer.

The X-CallInfo header may be used to send information about the interaction as a whole. This header may include a set of key-value pairs for each known property of the interaction. Some of these attributes may not make sense at the beginning of the call and/or may be changed during the call. The UAC/contact center may then send these attributes using the INFO request or the final BYE request. A recording interaction with multiple SIP calls may have this header on a single SIP Call. The preferable call is the first call setup with the RC.

The following keys may also be associated with the communication data. CLI (Caller Line Information) may represent information about the caller including the address (e.g., URI) from where a customer is calling and the customer's name. In a TDM (Timed-Division Multiplexing) environment, this may include the full 10-digit telephone number (in the United Stated). In a true VoIP environment, the CLI may include the "From" header (Display Name and SIP URI) of the original call.

One should note that the above description is included as a non-limiting example. More specifically, the description above is used to illustrate the sending of CTI and party information related to a call, and is not necessarily limited to the protocol and/or headers described above.

Another key that may be associated with a communication is a DNIS (Dialed Number Identification Service). The DNIS may include the address first dialed to setup the interaction. "Completion Reason" may also be included. Completion Reason may include a code and/or string indicating why the interaction was stopped. "External Interaction ID" is an external value that can be tagged to interactions that are related. This may cover completely separate recording interactions in the recording center. "Route Point" is a queue on a switch or any directory number the interaction traversed before being routed to the current party. A plurality of keys may exist to indicate a plurality of Route Points the interaction traversed.

"Call Direction" may be configured to indicate the initial direction of the call. Values associated with call direction may include inbound (an interaction that was received at the contact center), outbound (an interaction that is initiated at the contact center and is sent to another system), and internal (between two parties on the contact center). "Held Time" may include the total amount of time the interaction was on hold. "Interaction Duration" may include the total amount of time of the interaction. The customer center telephony system may also be configured to send in any custom key to tag other data into the or recorder 206. The data may be accessible to the recording center for searching, replay, and business rule evaluations. The format of the X-CallInfo header will be as follows: X-CallInfo: key=value; key=value. A non-limiting example might include: X-CallInfo: CLI=7705551212;DNIS=8001234567;RoutePoint=9200;RoutePoint=9421;NumberOfHolds=1; HeldTime=67;CallDirection=Inbound; CusomterAccountNumber=87654321;IssueLevel=Severe.

The SIP Calls (interactions) between the recording center and the customer center telephony system/contact center 200 may be configured to include one way media traveling from the customer center telephony system/contact center 200 to the recording center. The recorder 206 may be configured to support both recordings with a single stream from the contact center and recordings with multiple streams (preferably one stream per party in the initial interaction). In both cases, one or more of the streams may arrive as separate SIP communications.

In the case of a single stream, a single recording SIP communication (interaction) may be setup between the customer center telephony system and the recorder 206. If there is more than one stream from the customer center telephony system, one or more of the streams may arrive on different SIP Calls (interactions) between the customer center telephony system and the recorder 206. To associate the separate interactions together, a single unique identifier may be utilized for the interactions. This unique identifier may arrive as the value to an "x-callref" tag in the "From" field and/or as an "X-Call-ID" header on the communication. The following examples demonstrate implementations of a unique identifier:

From "John Doe" <sip:2332@example.com>; x-callref=12345678 X-Call-ID: 12345678.

In some implementations, the contact center may be configured to treat interactions as duplicates of the original interactions to implement duplicate media streaming functionality in the handsets, gateways or other systems in the contact center for, e.g., recording.

This invention uses the RTCP information (or any secondary communication channel) to facilitate correlating business information to allow gateway recording. Using information in this secondary communication channel the recording system can correlate the business meta-data either directly (e.g., using the phone extension) or through one or more indirect operations (e.g., call ID to universal call id to phone extension). Additionally information in the primary communication channel can be used to perform an indirect operation to correlate auxiliary business information (e.g., use the CALLID or UCID in SIP signaling to resolve the agent's phone extension and thereby access auxiliary business information.)

As noted above, a secondary channel may be Real Time Control Protocol (RTCP) information (or any secondary communication channel information) to facilitate correlating business information in gateway recording environments. The information in this secondary communication channel may be used by the recording system can correlate the business metadata either directly using, e.g., a phone extension or through one or more indirect operations such as call ID-to-universal call ID-to-phone extension. For example, the recorder 206 may monitor the RTCP stream via an interception NIC. The secondary channel may include information such as details available to the communications device (e.g., agent phone 210a, 210b), whether made visible to the user, that can be forwarded to the recorder 206. Additionally, the communications device can be configured to forward details of the user's interaction with the communications device and the recorder. As a non-limiting example, the communications device may be configured to forward data such as speed of dialing, time when the communications device goes off-hook, etc. (i.e. events that do not form part of the normally recorded call).

Figure 4:
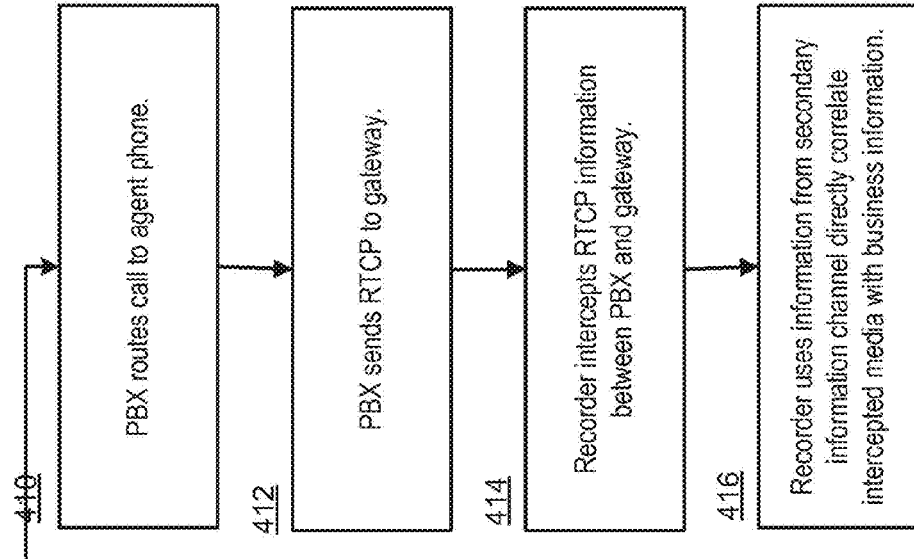
FIG. 4 illustrates an exemplary operational flow of direct correlation information from a secondary information channel.
Figure 4:
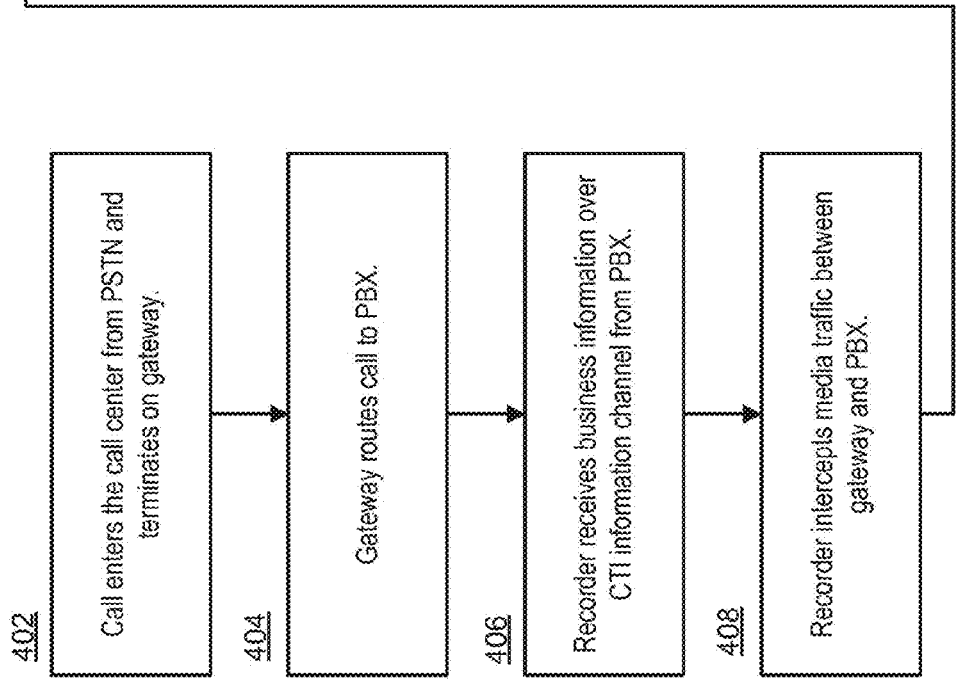
Figure 5:
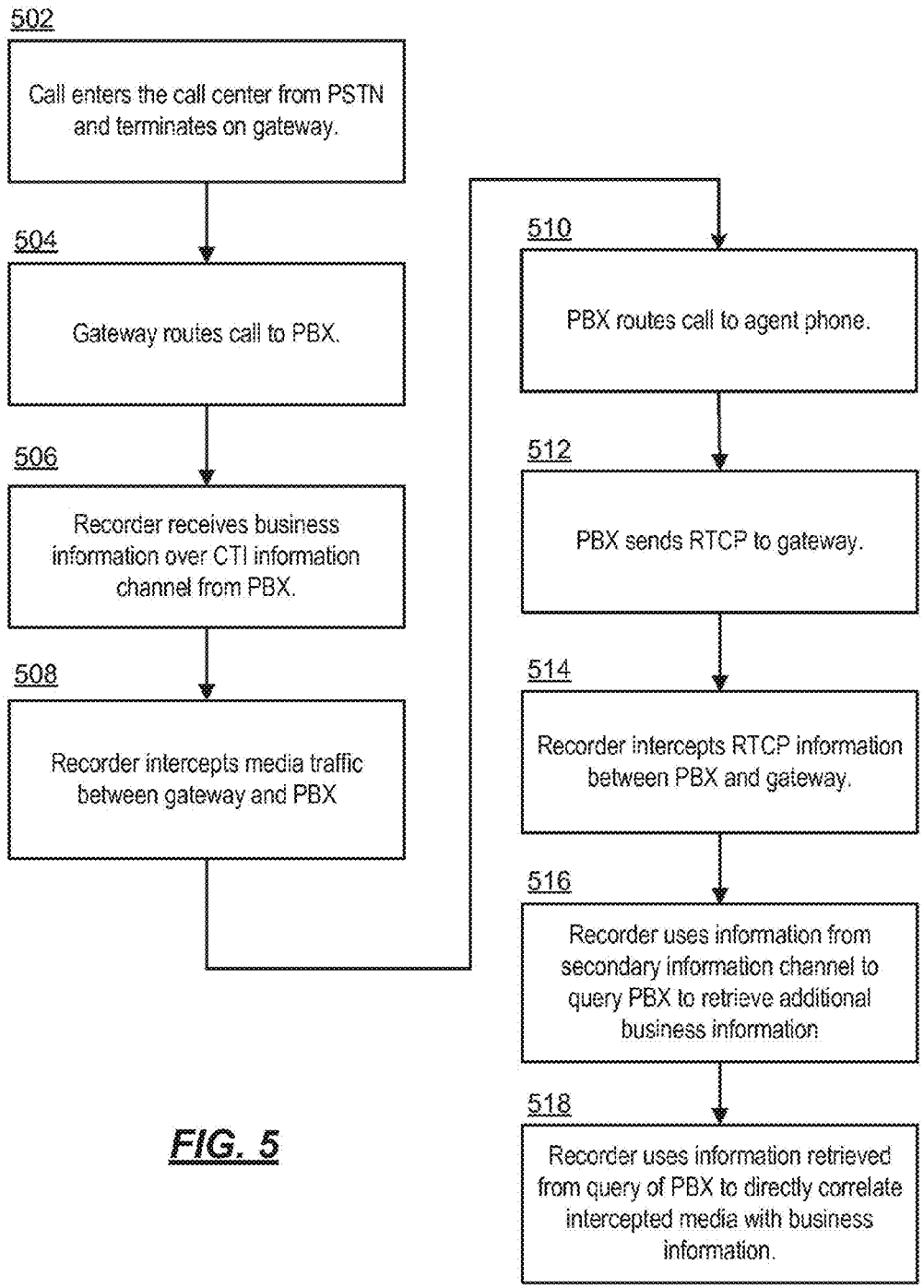
FIG. 5 illustrates an exemplary operational flow of indirect correlation from the secondary information channel.

FIGS. 4-5 illustrate exemplary operational flows for metadata correlation using a secondary information channel. FIG. 4 illustrates an exemplary operational flow of direct correlation from the secondary information channel. FIG. 5 illustrates an exemplary operational flow of indirect correlation from the secondary information channel.

Referring now to FIG. 4, at 402, an inbound call enters the call center from the PSTN and is terminated at the Gateway. For example, the call may come in over the PSTN 116 and terminate at the gateway 202, as shown in FIG. 3. The call may come in over SIP or TDM trunks. At 404, the gateway routes the call to the PBX. At 406, the recorder receives business information over the CTI information channel from the PBX. At 408, the recorder intercepts media traffic between the Gateway and the PBX. The media traffic may be contained in SIP or RTP data. At this time; however, the recorder 206 may not be to correlate the intercepted media with business information received over the CTI information channel.

Next at 410, the PBX routes the call to the agent phone. For example, call may be routed to the agent phone 210a. At 412, the PBX sends RTCP information to the gateway. At 414, the recorder intercepts the RTCP information indicated between the PBX and the gateway. For example, the recorder 206 may monitor the RTCP stream via an interception NIC. Additionally, the communications device (e.g., agent phone 210a) may be configured to forward details of the user's interaction with the communications device and the recorder. The RTCP information may include details about the call, such as those noted above. At 416, the recorder uses information from the secondary information channel (e.g., RTCP) to directly correlate intercepted media with business information. For example, the recorder may use a phone extension number of the agent phone 210a to correlate the business information with the intercepted media.

Referring now to FIG. 5, the operations performed at 502-514 are substantially similar to those performed at 402-414, describe above. At 516, the recorder uses information in the secondary information channel to query the PBX to retrieve additional business information. For example, the information in the secondary information channel (RTCP information) may include a call ID. The Call ID may be used to query the PBX to retrieve additional business information such as a phone extension. At 518, the recorder uses information a retrieved as a result of the query of the PBX to directly correlate intercepted media with business information.

It is noted that the above-described implementations are merely possible examples of implementations, merely set forth for a clear understanding of the principles of the invention. Many variations and modifications may be made to the above-described implementations without departing substantially from the spirit and principles of the invention. All such modifications and variations are intended to be included herein within the scope of this disclosure and the present invention and protected by the following claims.

What is claimed:

1. A method for centrally recording voice transactions and correlated business information in a phone system for a call center, the method comprising:
   communicating calls to/from the call center using a gateway,
   routing the calls to/from at least one communication device using a private branch exchange (PBX) connected to the gateway via an SIP trunk, the PBX also connected to at least one communication device;
   intercepting, from the calls communicated on the SIP trunk, voice transactions and SIP signaling information;
   receiving interaction information from the communication devices, wherein the interaction information from a particular communication device corresponds to a user's interaction with the particular communication device;
   recording the voice transactions on a recorder;
   receiving, at the recorder, business information;
   correlating the recorded voice transactions with the business information using the received interaction information.

2. The method of claim 1, further comprising:
   based on the correlating, tagging the recorded voice transactions for future retrieval and/or replay.

3. The method of claim 1, wherein the recorder comprises:
   a plurality of recording devices, and
   a recorder controller for controlling the recording devices.

4. The method of claim 3, wherein the recorder controller directs the recording devices to receive the voice transactions on open ports, and to start/stop recording on the open ports.

5. The method of claim 3, wherein the recorder controller (i) oversees an SIP stack, (ii) decides if a particular voice interaction should be recorded based on information in the SIP stack, and (iii) if recording is required, determines which recording device records the particular voice interaction.

6. The method of claim 5, wherein the recorder controller determines which of the recording devices records the particular voice interaction based on load balancing rules.

7. The method of claim 5, wherein the recorder controller determines if recording is required based on a unique identifier corresponding to the particular voice transaction's IP address and/or port number.

8. The method of claim 1, wherein the intercepting, from the calls communicated on the SIP trunk, voice transactions and SIP signaling information, comprises:
   using a switched port analyzer on the gateway to copy the calls and send the copied calls to a destination port.

9. The method of claim 1, wherein the intercepting, from the calls communicated on the SIP trunk, voice transactions and SIP signaling information, comprises:
   configuring the recorder as an SIP endpoint.

10. The method of claim 1, wherein the intercepting, from the calls communicated on the SIP trunk, voice transactions and SIP signaling information, comprises:
   configuring the recorder to emulate an SIP phone/trunk.

11. The method of claim 1, wherein the intercepting, from the calls communicated on the SIP trunk, voice transactions and SIP signaling information, comprises:
   using an interception NIC to monitor a real time control protocol (RTCP) stream.

12. A system for recording voice transactions and correlated business information from a phone system for a call center, the system comprising:
   a gateway that communicates calls to/from the call center, wherein the gateway:
      intercepts voice transactions and SIP signaling information from the calls, and
      receives interaction information from communication devices communicatively coupled to the gateway, wherein the interaction information from a particular communication device corresponds to a user's interaction with the particular communication device; and
   a recorder that:
      receives the voice transactions, the interaction information, and business information,
      records the voice transactions, and
      correlates the recorded voice transaction with the business information using the received interaction information.

13. The system according to claim 12, wherein the voice transactions are single streams corresponding to one party of a call.

14. The system according to claim 12, wherein the gateway is located in a branch office of the call center and the recorder is located in a recording center that communicates with the branch office via an IP network, wherein the recording center uses encryption to securely communicate with the branch-office's gateway.

15. The system according claim 12, wherein the user's interaction with a communication device includes speed of dialing and/or off-hook time.

* * * * *